US009161661B2

(12) United States Patent
Kelly

(10) Patent No.: US 9,161,661 B2
(45) Date of Patent: *Oct. 20, 2015

(54) DOUBLE WALLED BEVERAGE CONTAINER AND METHOD OF MAKING SAME

(71) Applicant: MILLERCOORS, LLC, Golden, CO (US)

(72) Inventor: Jason M. Kelly, Arvada, CO (US)

(73) Assignee: MillerCoors, LLC, Golden, CO (US)

( * ) Notice: Subject to any disclaimer, the term of this patent is extended or adjusted under 35 U.S.C. 154(b) by 0 days.

This patent is subject to a terminal disclaimer.

(21) Appl. No.: 14/186,405

(22) Filed: Feb. 21, 2014

(65) Prior Publication Data
US 2014/0166651 A1 Jun. 19, 2014

Related U.S. Application Data

(60) Continuation of application No. 12/986,042, filed on Jan. 6, 2011, now Pat. No. 8,667,662, which is a division of application No. 11/622,995, filed on Jan. 12, 2007, now Pat. No. 7,882,975.

(51) Int. Cl.
A47J 41/00 (2006.01)
B65D 81/38 (2006.01)

(52) U.S. Cl.
CPC ......... A47J 41/0077 (2013.01); B65D 81/3806 (2013.01); B65D 81/3818 (2013.01); Y10T 29/49908 (2015.01); Y10T 29/49909 (2015.01); Y10T 29/49915 (2015.01); Y10T 29/49917 (2015.01); Y10T 29/49918 (2015.01); Y10T 29/49927 (2015.01); Y10T 29/49945 (2015.01)

(58) Field of Classification Search
CPC ............ A47J 41/0077; B65D 81/3806; B65D 81/3818; Y10T 29/49945; Y10T 29/49909; Y10T 29/49915; Y10T 29/49908; Y10T 29/49917; Y10T 29/49918; Y10T 29/49927
See application file for complete search history.

(56) References Cited

U.S. PATENT DOCUMENTS

| 1,208,483 | A | 12/1916 | Chesbrough |
| D92,781 | S | 7/1934 | Tricard |
| D99,407 | S | 4/1936 | McManus |
| 2,063,013 | A | 12/1936 | Cooper |
| 3,317,110 | A | 5/1967 | Palmer |
| 3,355,080 | A | 11/1967 | Rausing et al. |
| 3,443,715 | A | 5/1969 | Edwards |
| D215,819 | S | 11/1969 | Heintze et al. |
| 3,558,001 | A | 1/1971 | Fritz et al. |
| 3,662,944 | A | 5/1972 | Joosten, Sr. |
| 3,717,274 | A | 2/1973 | Wingardh |
| 3,799,423 | A | 3/1974 | Cvacho |
| 3,813,801 | A | 6/1974 | Vander Schaaf |
| D231,972 | S | 7/1974 | Mitchell |
| 4,163,374 | A | 8/1979 | Moore et al. |
| 4,172,152 | A | 10/1979 | Carlisle |
| 4,219,578 | A | 8/1980 | Collias |
| 4,255,457 | A | 3/1981 | Collias |
| D260,858 | S | 9/1981 | Courreges |

(Continued)

Primary Examiner — John C Hong
(74) Attorney, Agent, or Firm — Sheridan Ross P.C.

(57) ABSTRACT

A double walled container is provided for insulating a beverage. An outer insulating shell or container is secured to the inner container that holds the beverage. A gap exists between the outer container and inner container and the air in the gap acts as an insulating barrier. The inner container is preferably a standard aluminum container. The outer container is preferably made from aluminum or a plastic polymer.

3 Claims, 7 Drawing Sheets

(56) References Cited

U.S. PATENT DOCUMENTS

| | | |
|---|---|---|
| 4,466,553 A | 8/1984 | Zenger |
| D286,000 S | 10/1986 | Bussell |
| D286,374 S | 10/1986 | Bussell |
| D290,688 S | 7/1987 | Moloney et al. |
| 4,735,333 A | 4/1988 | Lay et al. |
| 4,892,215 A | 1/1990 | Carlson et al. |
| D306,972 S | 4/1990 | Moloney et al. |
| D332,750 S | 1/1993 | Moloney et al. |
| 5,261,558 A | 11/1993 | Claydon |
| 5,279,442 A | 1/1994 | Jentzsch et al. |
| 5,312,013 A | 5/1994 | Bridges |
| 5,335,809 A | 8/1994 | Toida et al. |
| D353,337 S | 12/1994 | Halasz et al. |
| D355,368 S | 2/1995 | Gruodis |
| D356,265 S | 3/1995 | Moloney et al. |
| D359,690 S | 6/1995 | Heinz |
| 5,431,297 A | 7/1995 | Rosello |
| D368,035 S | 3/1996 | Ahern, Jr. |
| RE35,830 E | 6/1998 | Sadlier |
| 5,954,217 A | 9/1999 | Brkovic et al. |
| 6,050,443 A | 4/2000 | Tung |
| 6,076,699 A | 6/2000 | Seager et al. |
| 6,098,832 A | 8/2000 | Jentzsch et al. |
| 6,119,889 A | 9/2000 | Fujii et al. |
| 6,308,846 B1 | 10/2001 | Muller |
| 6,419,108 B1 | 7/2002 | Toida et al. |
| 6,561,376 B2 | 5/2003 | Price et al. |
| 6,626,326 B2 | 9/2003 | Murakami |
| D490,317 S | 5/2004 | Chang |
| D595,584 S | 7/2009 | Yamamoto |
| 7,882,975 B2 * | 2/2011 | Kelly ............... 220/23.87 |
| D641,261 S | 7/2011 | Diss et al. |
| D661,198 S | 6/2012 | Duecker et al. |
| 8,448,810 B2 * | 5/2013 | Kelly et al. ......... 220/592.27 |
| 8,667,662 B2 | 3/2014 | Kelly |
| 2003/0230586 A1 | 12/2003 | Murakami |
| 2006/0186125 A1 | 8/2006 | Tew |

\* cited by examiner

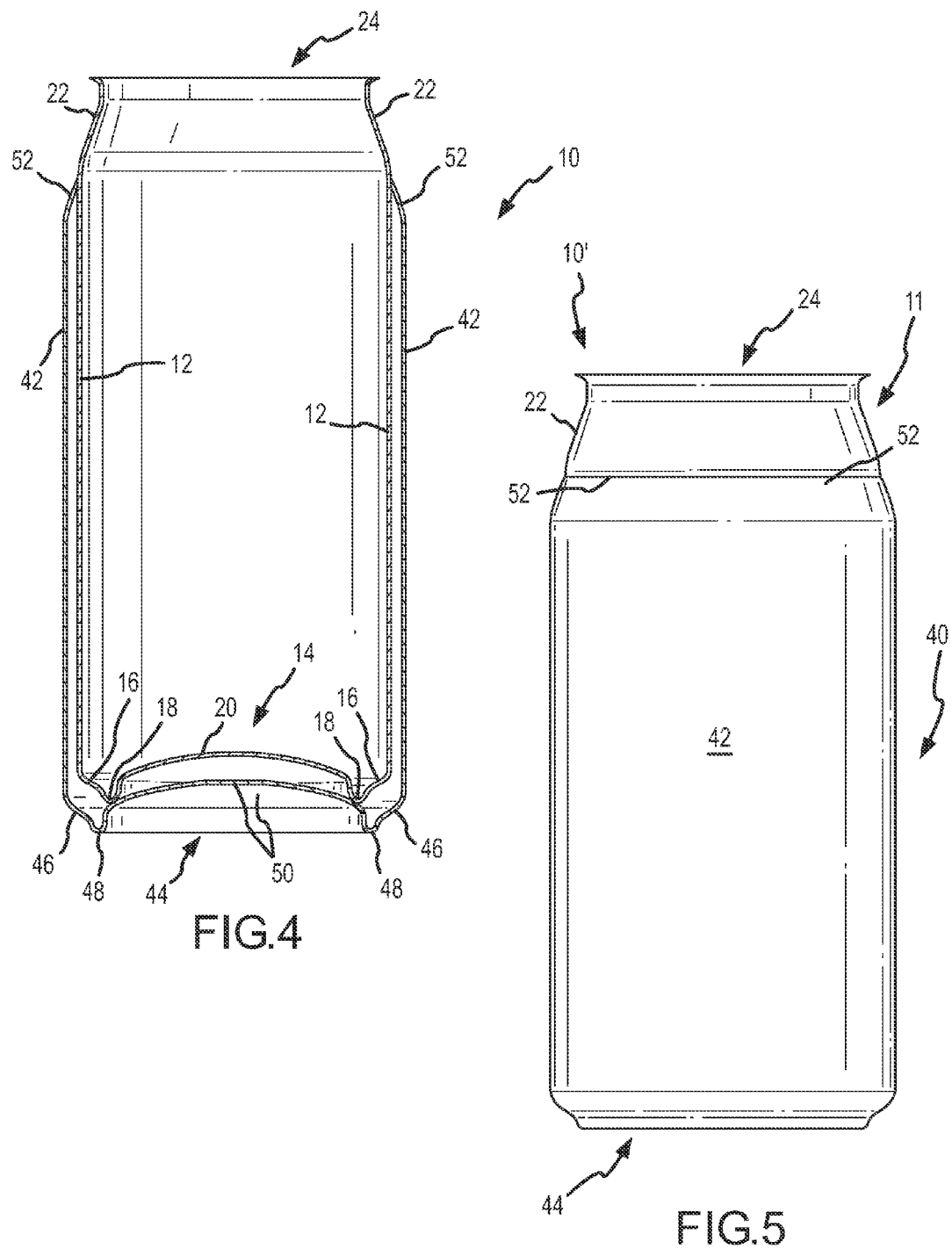

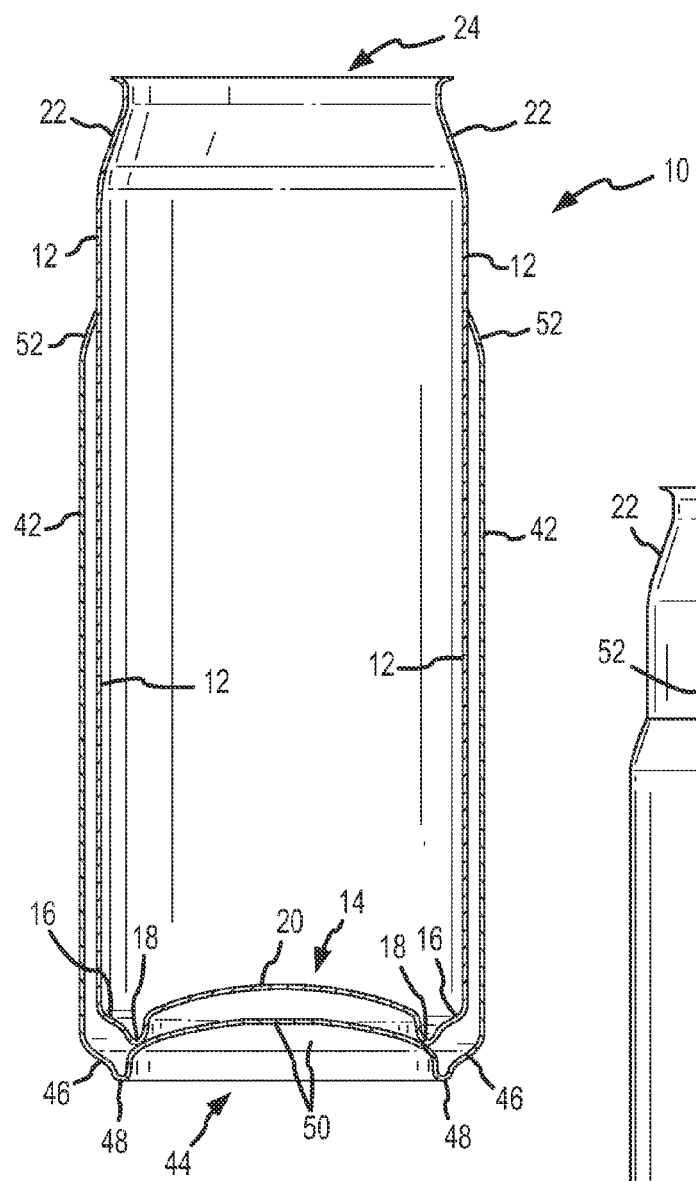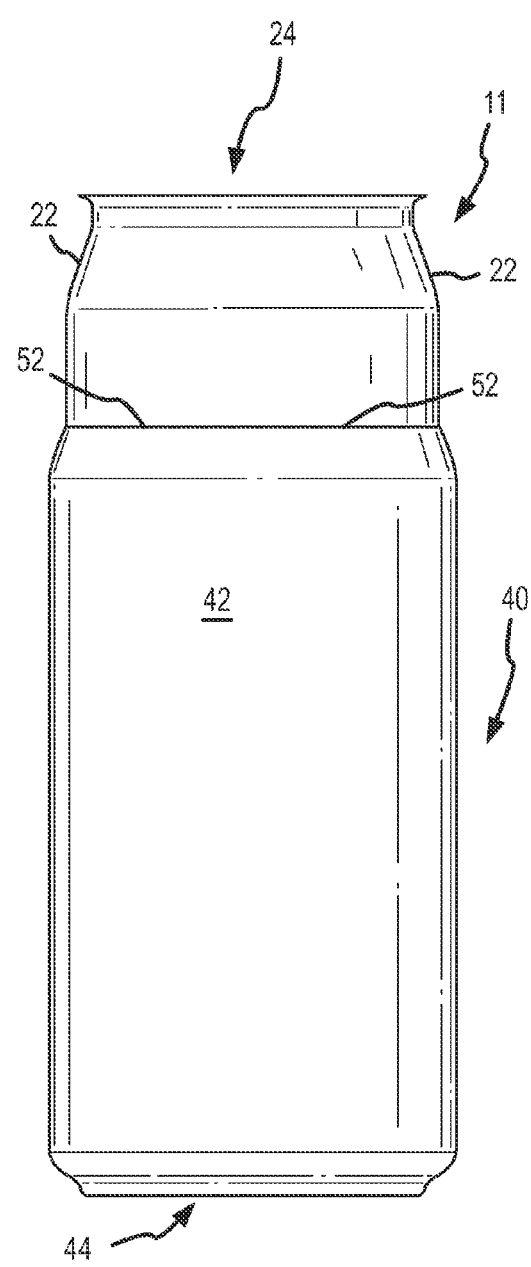
FIG.6
FIG.7

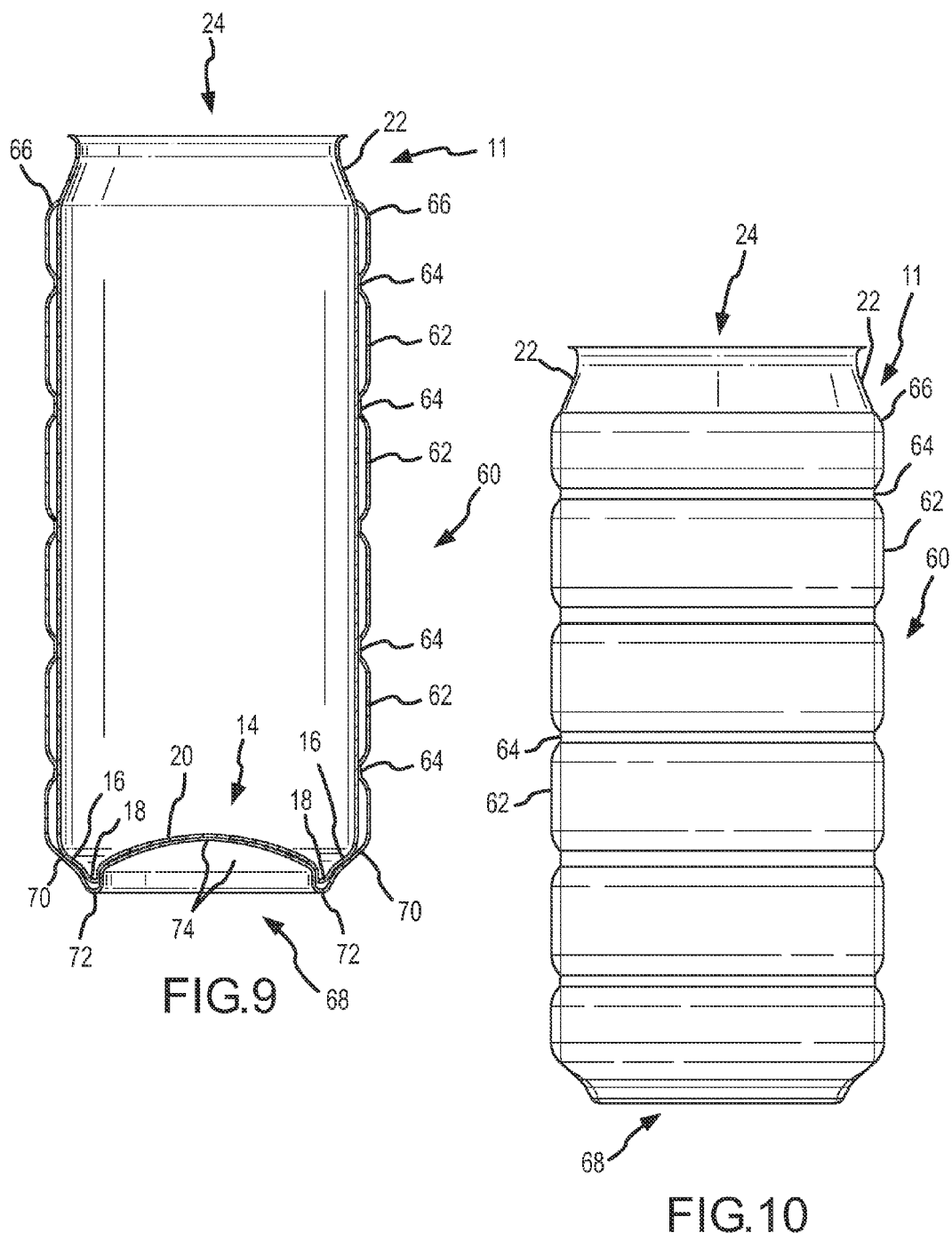

DOUBLE WALLED BEVERAGE CONTAINER AND METHOD OF MAKING SAME

REFERENCE TO RELATED APPLICATIONS

This application is a continuation application of U.S. patent application Ser. No. 12/986,042, filed on Jan. 6, 2011, which is a division of U.S. patent application Ser. No. 11/622,995 filed on Jan. 12, 2007 now issued as U.S. Pat. No. 7,882,975 on Feb. 8, 2011, each of which are hereby incorporated by reference in their entirety.

FIELD OF THE INVENTION

The present invention relates to beverage containers, and more particularly, to a double walled beverage container that enhances the ability of the container to maintain the beverage therein at a desired temperature.

BACKGROUND OF THE INVENTION

Aluminum beverage containers are perhaps the most widely used container to hold a number of different types of beverages. There are many advantages of using an aluminum container, including ease in manufacture and low relative cost. However, one distinct disadvantage of an aluminum container is its inability to insulate the contents of the container.

It is well known that aluminum containers must be refrigerated if the beverage therein is to be served cold. Additionally, even if the beverage is refrigerated immediately prior to consumption, the temperature of the beverage will quickly warm by contact of the consumers hand with the container.

One remedy for providing some insulation for the cooled beverage within the aluminum container is to place an insulating outer container over the container. These outer containers are typically made from a type of resilient foam. The exterior circumference of the outer container is considerably larger than the circumference of the container. The outer container is removed from the container when the beverage has been consumed. Although these simple foam outer containers may be adequate for their intended purpose, there is a need to provide an insulated container that does not substantially change the size or shape of the container when held by a consumer. There is also a need to provide a container with an integral insulating feature that does not require a separate device like a foam outer container to be secured thereto. Additionally, there is a need to provide an insulated beverage container that is still simple and cost effective to manufacture, and maintains consumer appeal when the insulated beverage container is displayed for sale.

SUMMARY OF THE INVENTION

In accordance with the present invention, an insulated beverage container is provided in the form of a double walled container. The double walled container includes a standard aluminum beverage container in combination with an outer container that substantially conforms to the shape of the inner aluminum container. Preferably, the outer container also is made from aluminum.

In a first embodiment of the present invention, the double walled container of the present invention comprises a standard aluminum container with an outer container or shell that surrounds the sidewalls and base of the aluminum container. The outer container or shell has a complementary shape, and the dome of the inner aluminum container nests within a dome of the outer container. A small gap is maintained between the sidewalls of the inner container and the outer container, and this gap provides an insulating air space that helps to maintain the temperature of the beverage. Instead of a nesting configuration between the domes of the inner container and the outer container, the circumferential leg or protrusion on the base of the inner container may rest on the dome of the outer container. In this arrangement, a greater gap is provided between the sidewalls of the inner container and outer container.

Additional features of the present invention include annular grooves that may be formed on the outer container to assist in gripping the container. Additionally, for the embodiment including the outer container made of a polymer, the color and finish of the polymer may be chosen to enhance the graphics used on the inner container.

Additionally, debossing or embossing the outer container member may further enhance visual features of the inner container graphics.

While simply providing an air gap between the inner container and outer container may be adequate for insulating most beverages, it is also contemplated that the gap may be filled with an insulating material, such as polyurethane foam, to provide enhanced insulation. Additionally, material placed in the gap may further strengthen the container to prevent undesirable bending of the outer container if the outer container is firmly grasped by the consumer. Other materials that can be used to fill the gap between the inner container and outer container include closed cell foam, polystyrene, and corrugated cardboard. Additionally, a selected inert gas may be used to fill the gap, since some inert gases have better insulative capability as compared to air.

Also in accordance with the present invention, a method is provided for manufacturing a double walled container. For the manufacture of the inner aluminum container, it may be constructed in accordance with known methods for manufacturing standard aluminum containers. With respect to manufacturer of the aluminum outer container, the same manufacturing process can be used, with the exception that the outer container construction does not include attaching a top lid, and rather, the outer container is necked down at the top edge thereof to the same diameter as the inner container. The outer container is press fit onto the outer container. Press fitting the inner container and outer container enables a friction fit between the sidewall of the inner container and the upper edge of the outer container, and also helps to center the inner container so that the nesting configuration can be achieved between the respective domes. As necessary, a sealing or adhesive may be applied to ensure that the outer container remains secure to the inner container without slippage or inadvertent displacement. A small opening may be made in the dome or sidewall of the outer container to allow air to escape as the inner container and outer container are joined to one another during the press fit operation. Thereafter, the small opening may be sealed. In the event an inert gas is to be placed within the gap, this opening can be used to inject the inert gas. With respect to use of a plastic outer container, the plastic outer container can be made by an injection or compression molding process to produce a pre-form component. The pre-form component can then be blown in a mechanical/pneumatic process to form the final shape of the plastic outer container. The plastic outer container can be embossed, debossed, or otherwise manipulated to register features of the outer container with the design printed on the inner can. The plastic outer container is trimmed to a predetermined height. The plastic outer container can then be assembled to the inner container. The outer container may be pressed fit onto the inner container if the outer container has already been necked down at the upper end thereof. Alternatively, the outer container can be slipped over the inner container, and then localized heating at the upper portion of the outer container can cause the plastic material to tightly shrink to the inner container to form a tight seal. A sealing/adhesive compound can also be used to ensure that the outer container remains securely attached to the inner container.

Other features and advantages of the present invention will become apparent by a review of the following detailed description, taken in conjunction with the drawings.

BRIEF DESCRIPTION OF THE DRAWINGS

FIG. 4 illustrates a cross-sectional view of another embodiment of the present invention;

FIG. 5 is an elevation view illustrating the exterior appearance of the embodiment of FIG. 4;

FIG. 6 illustrates another cross-section similar to FIG. 4 but differing in the particular shape of the inner container and the height of the outer container;

FIG. 7 is an elevation view illustrating the exterior appearance of the container of FIG. 6;

FIG. 9 is a cross-section illustrating an assembled container of FIG. 8;

FIG. 10 is an elevation view illustrating the exterior appearance of the embodiment of FIG. 9.

DETAILED DESCRIPTION

Figure 1:
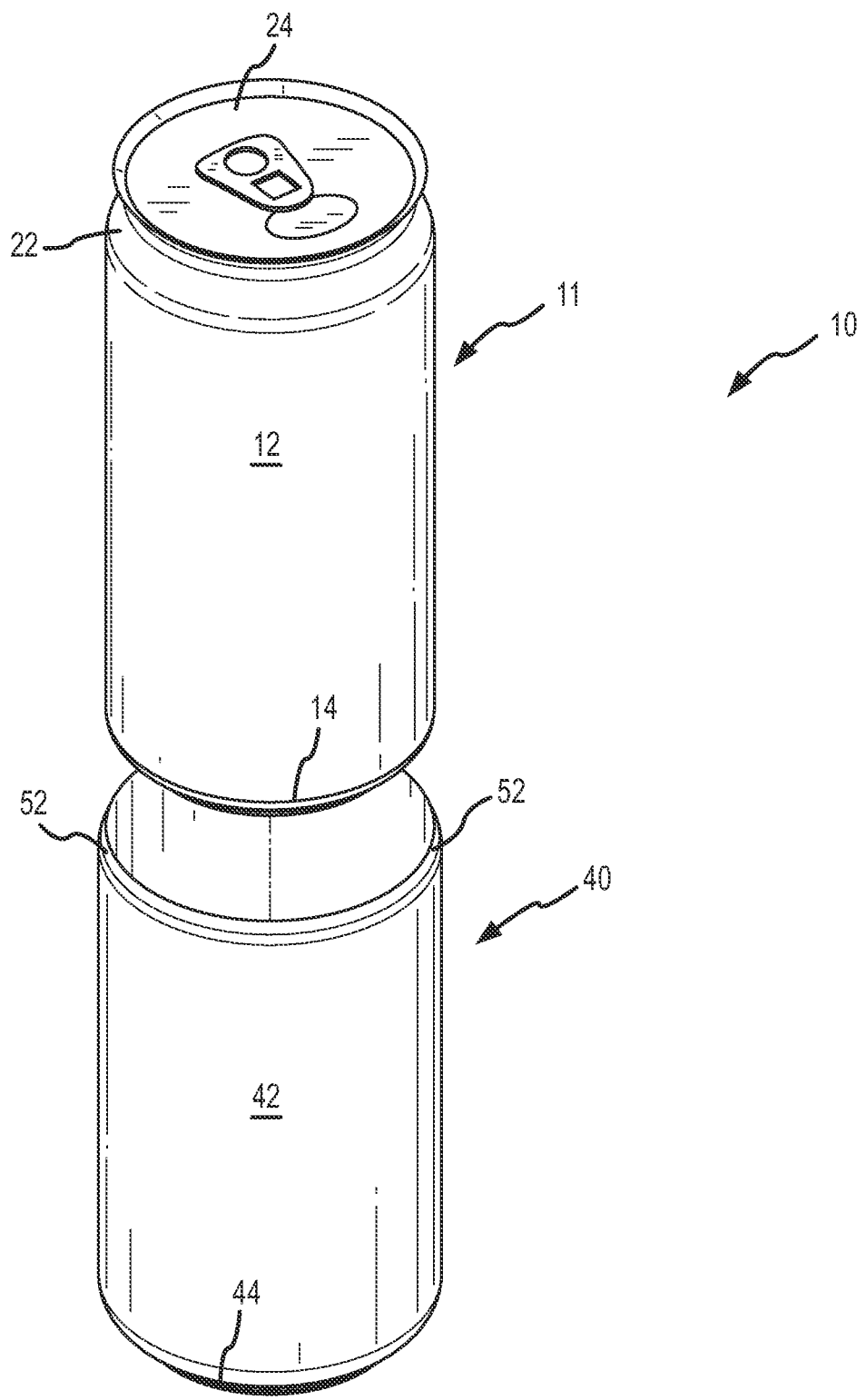
FIG. 1 is an exploded perspective view of a first embodiment of the present invention including an inner aluminum container and an outer aluminum container.
Figures 2, 3:
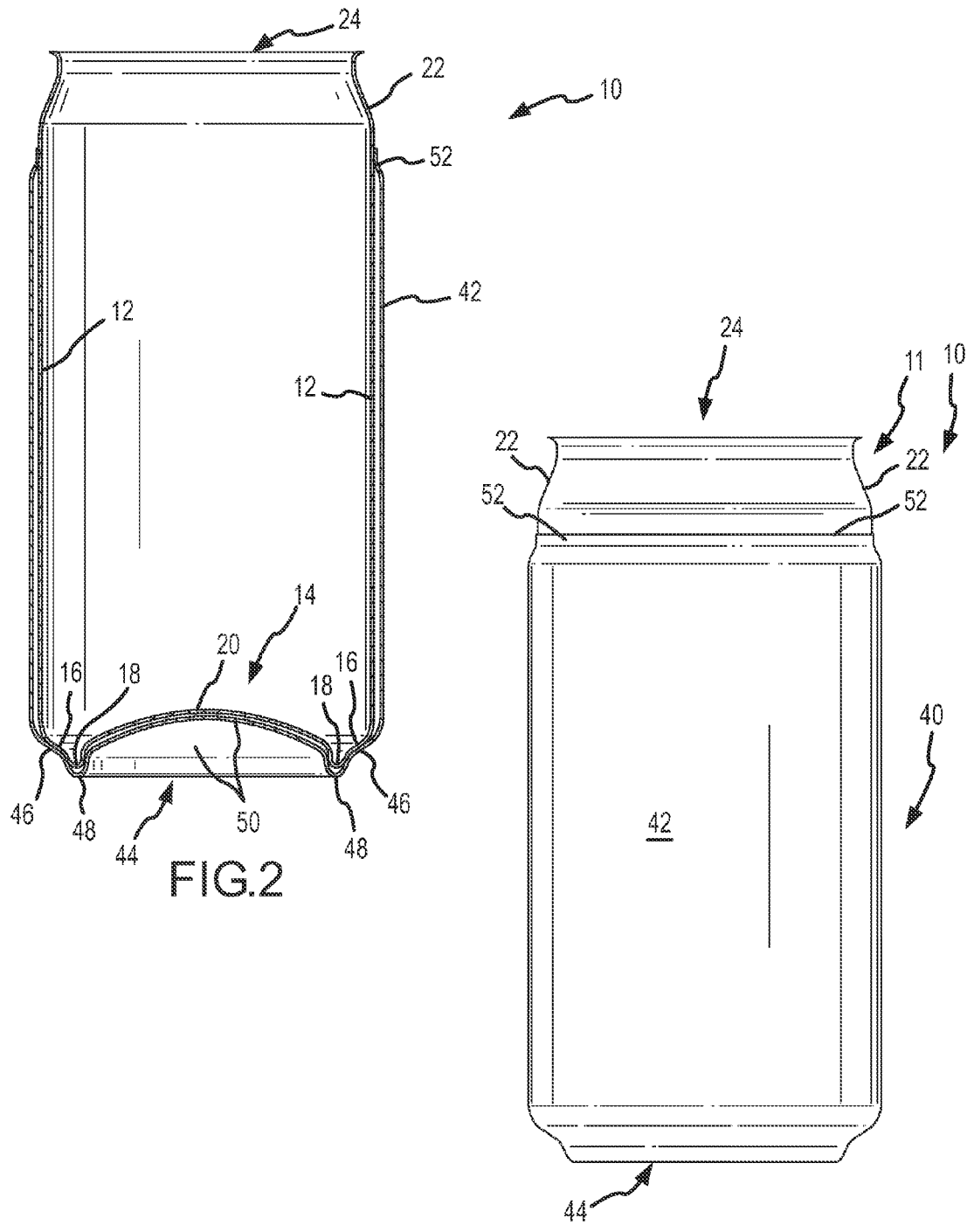
FIG. 2 is a vertical cross-section of the assembled container illustrating specifically the nested configuration between the domes of the inner container and the outer container.
FIG. 3 is an elevation view illustrating the exterior appearance of the assembled container.

FIGS. 1 and 2 illustrate a first embodiment of the present invention in the form of a double walled beverage container 10. The beverage container 10 comprises two components, namely, an inner container 11, and an outer casing, shell, or outer container 40.

In all of the embodiments, the inner container 11 is preferably a standard aluminum container. The inner container 11 comprises a cylindrical shaped sidewall 12, a base 14, an upper neck portion 22, and a top 24. The base 14 is further characterized as including a circumferential or annular concave portion 16, a dome shaped panel 20, and a circumferential/annular leg or protrusion 18. As set forth in, for example the U.S. Pat. No. 6,098,832, the particular shape of the base of the container provides the container with the necessary strength to house the beverage therein, and helps to minimize the amount of aluminum material used. The >832 patent is hereby incorporated by reference in its entirety herein for disclosing one basic construction for an aluminum container, and which is suitable for use in the present invention.

The outer container or casing 40 as illustrated has a complementary shape as the inner container 11. Specifically, the outer container 40 also comprises a cylindrical sidewall 42, base 44, circumferential concave portion 46, circumferential leg/protrusion 48, and dome shaped panel 50. The outer container/casing has a slightly larger shape that enables a nested configuration between the corresponding circumferential concave portions of both the inner container and the outer container. As shown in FIG. 2, the circumferential concave portion 16 of the inner container 11 rests on the circumferential concave portion 46 of the outer container 40. Accordingly, a substantially uniform gap is created between the sidewall 12 and the sidewall 42. Through testing, it has been found that providing approximately a ⅛-inch gap between the sidewall 12 and the sidewall 42 provides effective insulation for the beverage contained within the inner container.

The nested configuration of the respective domes and circumferential concave portions effectively centers the inner container within the outer container. As also shown in FIG. 2, there may also be a small gap that exists between the respective legs 18 and 48, as well as the respective domes 20 and 50. The primary insulation benefit is derived from the spacing of the respective sidewalls of the inner container and the outer container; however, a gap between the respective domes also provides some amount of additional insulation. It is also contemplated however that domes can be in contact with one another that may provide some additional stability between the inner container and outer container and without materially affecting insulation characteristics.

The upper portion of the outer container includes a circumferential transition 52 that attaches to the sidewall 12 as shown. The upper transition 52 tapers to contact the sidewall 12.

FIG. 3 illustrates the exterior appearance of the container of the first embodiment. Because of the complementary shape of the outer container, along with the relatively small gap between the inner container and outer container, the overall look of the container is essentially unchanged, yet the benefit of providing an insulated container is achieved.

The outer container may accept printing, debossing, embossing, or other surface treatments in order to provide a desired external presentation for the product.

It shall be understood that with respect to the embodiment of FIG. 1, the outer container 40 can be made of aluminum, or can be made of a plastic polymer. There are a number of plastic materials that can be used including clear monolayer PET, high or low-density polyethylene, PLA, among others. With respect to use of aluminum in the first embodiment, it is also contemplated that the outer container may be made of a full thick-walled member. A full thick-walled member refers to the sidewall 42 having a uniform thickness. For many aluminum containers, it is well known to Aneck down@ or thin the aluminum material located at the midsection of the sidewall in order to save on the amount of aluminum that is used within the container. Since the outer container is not under pressure, it is desirable to prevent the outer sidewall from collapsing when grasped. Therefore, by constructing the outer sidewall of a full, thick-walled member, the thicker mid-section helps to remedy any tendency of the outer container sidewall to collapse when grasped.

FIGS. 4 and 5 illustrate yet another embodiment of the container 10 of the present invention. The reference numbers used in this embodiment correspond to the same elements as those set forth in the first embodiment of FIGS. 1-3. The difference in the embodiment of FIGS. 4 and 5 is that there is no nested configuration between the domes of the inner container and the outer container. Rather, the leg 18 of the inner container rests on the dome panel 50 of the outer container as shown. This embodiment may be chosen if it is desired to provide a greater gap between the inner container and the outer container. In comparing FIGS. 3 and 4, there is very little difference in the overall exterior appearance, the basic cylindrical shape and size of the container being maintained.

FIGS. 6 and 7 illustrate yet another embodiment of the present invention. The same reference numbers are also used in FIGS. 6 and 7 as in the first embodiment to denote the same structural elements. The embodiment of FIGS. 6 and 7 is similar to the embodiment of FIGS. 4 and 5 in that the leg 18 of the inner container 11 rests on the dome 50 of the outer container. FIGS. 6 and 7 differ from the embodiment of FIGS. 4 and 5 in that the sidewall 42 of the outer container 40 does not extend as far upwards along the sidewall 12. In the case of FIGS. 6 and 7, the shorter appearing outer container may be a result of simply providing an inner container 11 of a greater height, or reducing the height of the side wall 42 of the outer container 40.

Figure 8:
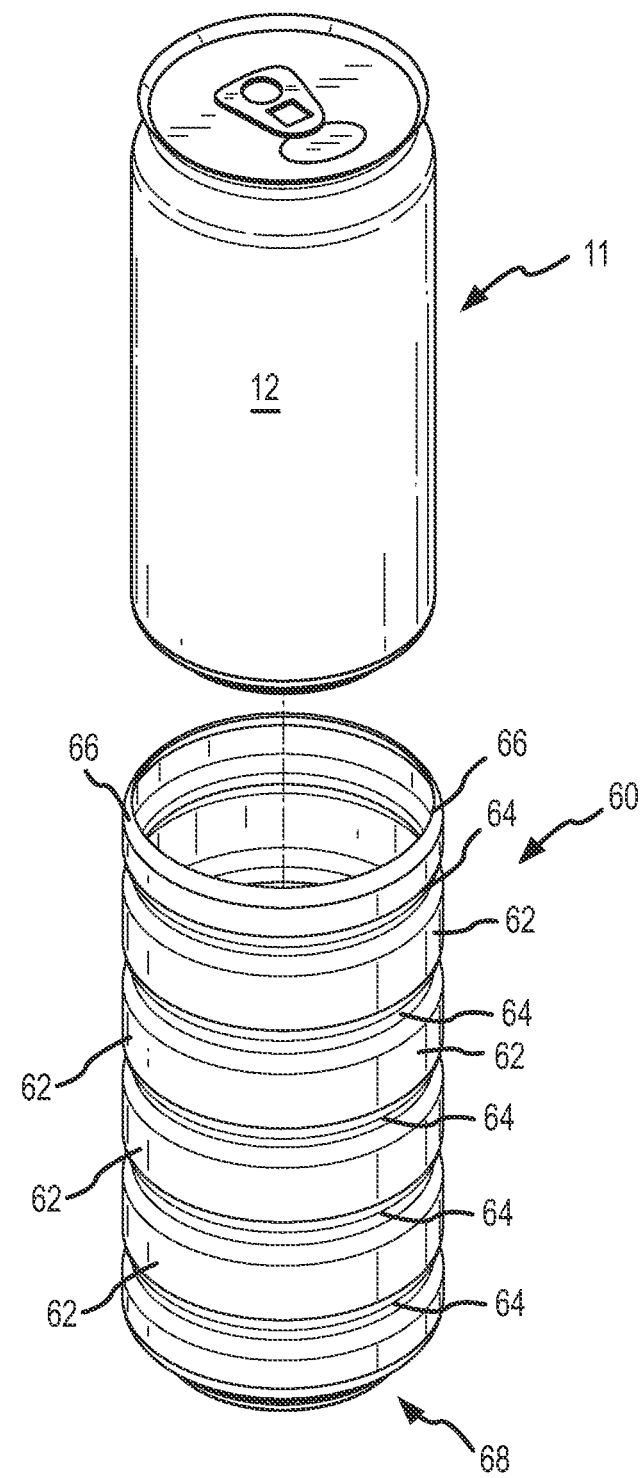
FIG. 8 is an exploded perspective view of another embodiment of the present invention including an inner container and a polymer/plastic outer container.

FIGS. 8-10 illustrate another embodiment of the present invention. In this embodiment, the same inner container 11 is provided, but the outer container 60 is preferably made from a plastic polymer. As shown, the outer container 60 includes a side wall 62, a plurality of spaced annular grooves 64, a neck 66, base 68, a circumferential frusto-conical concave portion 70, circumferential leg 72, and dome shaped panel 74. Thus, with respect to the specific shape of the outer container 60, it is very similar to the outer container 40 with the exception that the plurality of annular grooves 64 is formed. FIG. 9 is a cross section illustrating the outer container 60 assembled to the inner container wherein the inner surface of the outer container makes contact with the sidewall 12 at the location of the grooves 64; however a gap is maintained between the other parts of the outer container and the sidewall 12. Because of the inherent insulative characteristics of some plastic materials, effective insulation may be maintained despite the contact of the outer container at some locations against the sidewall of the inner container. The annular grooves 64 may be provided for aesthetic/ornamental purposes, to increase the strength of the outer container, and/or to enhance the ability of a consumer to grip the double walled container Also in accordance with the present invention, a method is provided for manufacturing a double walled container. With respect to the manufacture of an inner aluminum and an aluminum outer container, the inner container may be constructed in accordance with known methods for manufacturing standard aluminum containers. As understood by those skilled in the art, manufacturing of the inner container comprises a number of steps to include drawing and ironing a single piece of aluminum into a desired shape, washing and printing the container, providing any desirable coatings for the interior surface of the container attaching the lid, and then filling. With respect to the manufacture of the aluminum outer container, the outer container is formed from one piece, is drawn and ironed in the same manner as a standard aluminum container. The outer container is then trimmed to a predetermined height, washed, printed, and coated to protect the interior and exterior surfaces thereof. The upper transition is then reduced in circumference by roll forming that part of the outer container. Preferably, the circumference of the upper transition is provided such that outer container must be press fit onto the inner container. Press fitting the inner container and outer container enables a friction fit between the side wall and the upper transition, and also helps to center the inner container so that the nesting configuration can be achieved between the respective domes. As necessary, a sealing/adhesive compound may be applied to ensure that the outer container remains secure to the inner container without slippage or displacement. The outer container may be assembled to the inner container prior to or after the filling of the inner container with the beverage.

As mentioned above, the outer container may comprise a full thick-walled piece of aluminum to prevent the outer container from easily collapsing by a firm grip from the consumer. Additionally, a stronger outer container may help to mitigate shipping damage. A small opening may be provided in the sidewall of the outer container or the dome of the outer container to enable air to escape as the inner container and outer container are press fit. After the inner container and outer container have been assembled, the opening may be sealed. By press fitting the inner container matter outer container, the contact of the outer container against the inner container at the location of the transition should prevent the container from inadvertently slipping or displacing; however, as mentioned above, an adhesive may be applied to the inner container at the location where it contacts the inner surface of the transition area in order to further ensure that the outer container remains securely attached to the inner container. If it is desired to fill the gap between the outer container and inner container with either a solid insulating material such as foam, or with an inert gas, the same opening through which air is allowed to escape during the press fit operation may be used to introduce the insulating foam or inert gas.

With respect to use of a plastic polymer outer container in accordance with the method of the present invention, the plastic outer container can be made by an injection or compression molding process to produce a preform component. The preform material can then be blown in a mechanical/pneumatic process to form the final shape of the outer container. The outer container can be embossed or debossed to register features of the outer container with the printed inner container. The blown outer container can be trimmed to a predetermined height. The outer container can then be assembled to the inner container. Localized heating in the neck portion of the outer container can cause the plastic polymer to tightly shrink to the inner container to form a tight seal. A sealing/adhesive compound could also be used to ensure that the outer container remains securely attached to the inner container.

Figure 11:
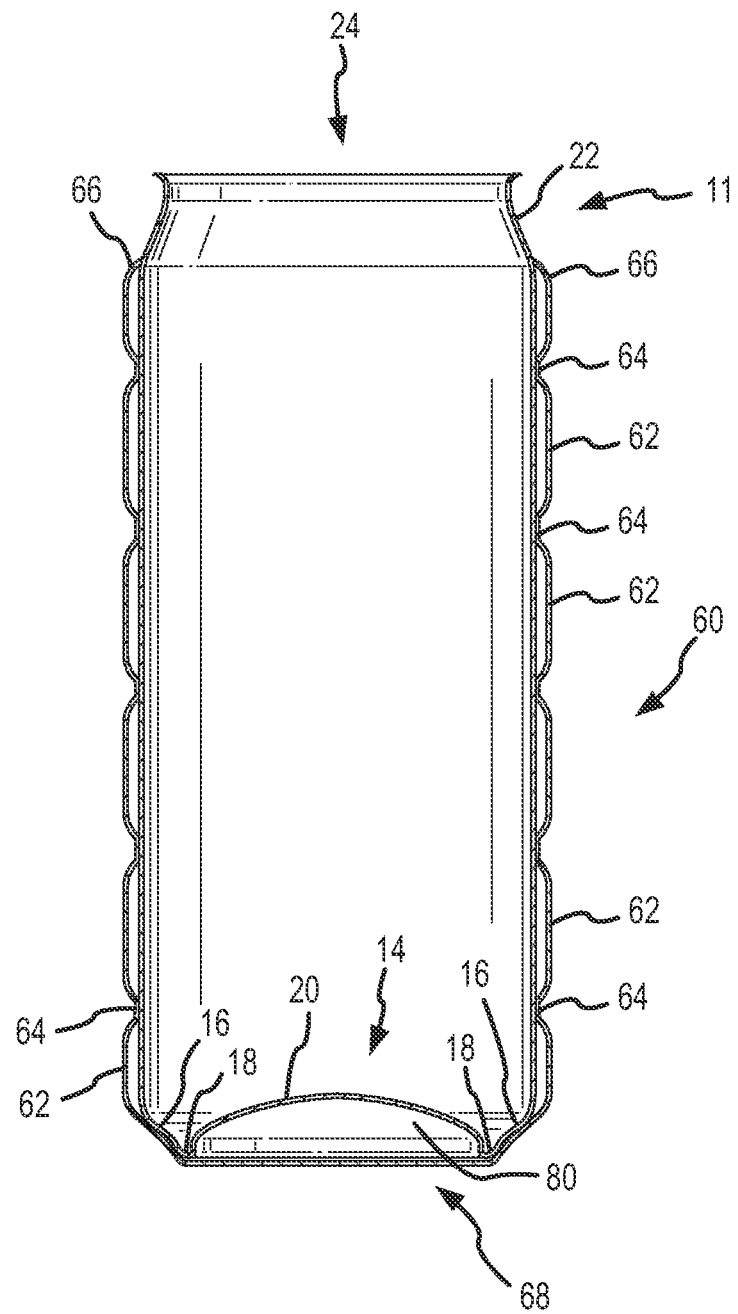
FIG. 11 is a cross-section illustrating yet another embodiment wherein the outer container does not have a dome shaped base and rather is flat.

FIG. 11 shows yet another embodiment of the present invention wherein a plastic outer container is used, and the base 68 of the outer container 60 is flat and does not have a dome shape. Thus, no nesting relationship exists between the base 68 and the base 14 of the inner container. Rather, a gap 80 exists between the base 68 and the base 14.

With respect to use of a plastic polymer outer container, the type of plastic material, the thickness of the material, and the color of the plastic material may be selected to enhance or modify the visual effect of the printed inner container. For example, the printed color of the inner container along with the chosen color for the outer plastic outer container may be combined for a unique visual effect. Further for example, the particular pattern printed on the inner container may be distorted by the shape of the outer surface of the outer container thereby providing a unique visual presentation.

Also, it shall be understood that with all of the embodiments, the particular height of the sidewall of the outer container can be adjusted in order to provide a desired amount of insulation covering for the inner container. In some circumstances, it may be desirable to reduce the height of the outer container member so that a greater portion of the inner container is exposed.

There are a number of advantages to the double walled container of the present invention. A simple yet effective means is provided for insulating a beverage within a standard aluminum container. The insulation is provided by an aesthetically pleasing, non-intrusive, and mechanically simple outer container. The outer container may be made from a number of materials to include simply a larger sized aluminum container minus the top, or a plastic polymer outer container. The nested domes create a uniform air gap between the inner container and outer container. The outer container does not substantially change the size of the inner container. The appearance of the inner container can be maintained with the plastic outer container, or special visual effects can be created by use of the outer container.

While the present invention has been described with respect to various preferred embodiments, it shall be understood that various other changes and modifications may be made to the invention in accordance with the scope of the claims appended hereto.

What is claimed is:

1. A double walled container comprising:
an inner container including a cylindrical sidewall, a base connected to said side wall and forming a lower portion of the container, and a top forming an upper portion of the container, said base including a dome shaped panel; and
an outer container secured to said inner container, said outer container comprising a cylindrical side wall, a base forming a lower portion of the outer container, and an upper transition portion forming an upper end of the outer container, said upper transition portion contacting said side wall of said inner container, said base of said outer container member including a dome shaped panel; and
wherein said side wall of said inner container and said side wall of said outer container are separated by a substantially uniform gap, and said dome-shaped panel of said outer container has a curved shape, and said dome-shaped panel of said inner container has a complimentary curved shape and spaced uniformly from said dome-shaped panel of said outer container.

2. A container, as claimed in claim 1, wherein:
said sidewall of said inner container is spaced approximately ⅛" from said side wall of said outer container, and wherein said side walls maintain said ⅛" spacing circumferentially around said inner container placed in said outer container.

3. A double-walled container comprising:
an inner container including a sidewall, a base connected to said side wall and forming a lower portion of the container, a top forming an upper portion of the container, said base including a dome-shaped panel; and
an outer container secured to said inner container, said outer container comprising a cylindrical side wall and a base forming a lower portion of the outer container, and an upper transition portion forming an upper end of the outer container, said upper transition portion contacting said sidewall of said inner container, said base of said outer container including a dome-shaped panel, said dome-shaped panel of said outer container having a complimentary shape as compared to the dome-shaped panel of said inner container, and said dome-shaped panels having substantially the same curvatures resulting in a nested configuration between said dome-shaped panels, and wherein said side wall of said inner container and said side wall of said outer container are separated by a substantially uniform circumferential gap; and
said outer container having a cylindrical side wall and a plurality of annular grooves formed on said side wall and spaced from one another along a height of said inner container.

* * * * *